April 12, 1960 — F. R. PERRY — 2,932,525
SLED RUNNER FOR TRACTORS
Filed Aug. 28, 1958
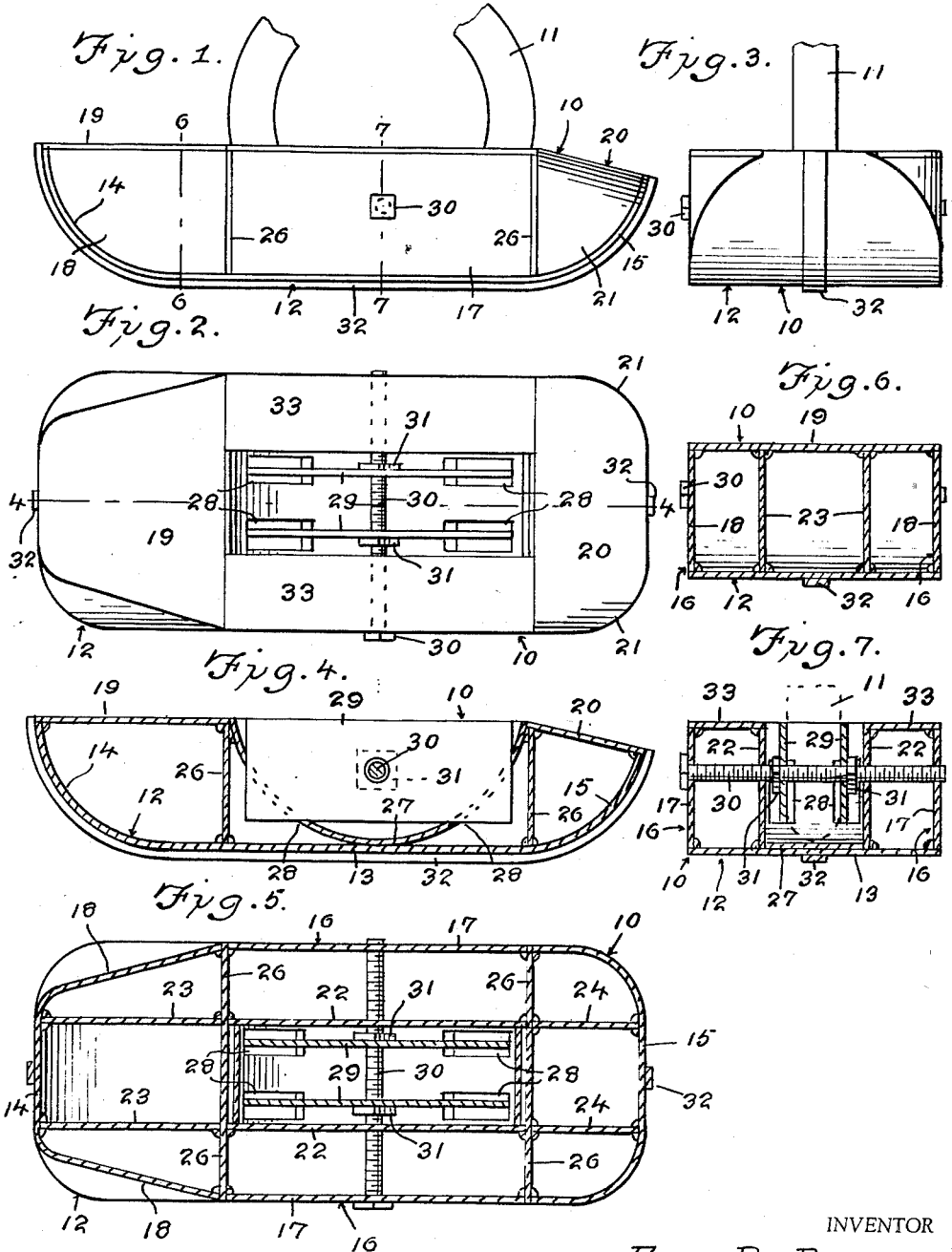
INVENTOR
Fay R. Perry
BY *Victor J. Evans & Co.*
ATTORNEY

United States Patent Office 2,932,525
Patented Apr. 12, 1960

2,932,525

SLED RUNNER FOR TRACTORS

Fay R. Perry, Lincoln Center, Maine

Application August 28, 1958, Serial No. 757,864

3 Claims. (Cl. 280—13)

This invention relates to a sled runner, and more particularly to a sled runner for a tractor wheel.

The object of the invention is to provide a sled runner which is adapted to be connected to the front wheel of a tractor whereby the tractor can be used even when heavy snow is present.

Another object of the invention is to provide a sled runner which can be readily connected to the wheel of a vehicle such as the wheel of a tractor whereby the tractor or the vehicle can be used even when there is heavy snow on the ground, since the sled runner of the present invention will prevent the tractor wheel from becoming bogged down in the snow, and wherein skidding and slipping of the tractor will be minimized or prevented.

A further object of the invention is to provide a sled runner for a tractor which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view illustrating the sled runner of the present invention attached to the front wheel of a tractor.

Figure 2 is a top plan view of the sled runner of the present invention.

Figure 3 is an end elevational view of the assembly shown in Figure 1.

Figure 4 is a sectional view taken on the line 4—4 of Figure 2.

Figure 5 is a horizontal sectional view taken through the sled runner of the present invention.

Figure 6 is a sectional view taken on the line 6—6 of Figure 1.

Figure 7 is a sectional view taken on the line 7—7 of Figure 1.

Referring in detail to the drawings, the numeral 10 indicates the sled runner of the present invention which is shown attached to the front wheel 11 of a tractor, Figure 1. The sled runner 10 includes a base which is indicated generally by the numeral 12, and the base 12 embodies a main straight portion 13 as well as upwardly curved front and rear portions 14 and 15.

The sled runner 10 further includes a pair of side members which are each indicated by the numeral 16, and each side member 16 includes an intermediate straight section 17, the sections 17 being arranged in spaced parallel relation with respect to each other, Figure 5. The side members 16 further include front sections 18 which are arranged angularly with respect to each other. The numeral 19 indicates a horizontally disposed front piece which extends across the front sections 18 of the side members 16. There is further provided a back piece 20 which is arranged above the rear of the base 12, and the back piece 20 includes curved portions 21.

There is further provided a pair of spaced parallel vertically disposed longitudinally extending ribs 22 which are arranged above the intermediate portion of the base 12. Front and rear vertically disposed braces 23 and 24 are arranged in alignment with the ribs 22, Figure 5. The numeral 26 designates each of a pair of spaced parallel partitions which are arranged transversely or at right angles with respect to the ribs 22 and braces 23 and 24.

The numeral 27 indicates a curved support member which is positioned between the ribs 22, Figure 4, and the support member 27 is provided with four cutouts or slots 28. The numeral 29 designates each of a pair of spaced parallel vertically disposed plates which have their lower corners projecting through the cutouts 28. A screw member or bolt 30 extends through the straight sections 17 of the side members 16 and through the ribs 22, and through the plates 29, and suitable securing elements such as the nuts 31 are arranged in threaded engagement with the screw members 30.

The numeral 32 indicates a longitudinally extending keel or bar which is arranged just below the base 12 and which is secured thereto or formed integral therewith, and the keel 32 helps prevent the sled runner from slipping in the snow or ice.

From the foregoing, it is apparent that there has been provided a sled runner which is especially suitable for use with a tractor whereby the tractor will be able to travel even when there is snow on the ground. The sled runner includes in addition to the previously described structure, horizontally disposed top members 33 which are positioned between the front and back pieces 19 and 20, Figure 2.

While the present invention has been described for use with a front tractor wheel, it is to be understood that the device can be used with other types of vehicles or wheels so as to provide the necessary traction to prevent the wheel from becoming bogged down in mud, snow, or the like.

Furthermore, while only one sled runner has been described and illustrated, it is to be understood that a pair of the sled runners are adapted to be used so that each of the front wheels 11 of the tractor can be equipped with one of the sled runners.

When the sled runner is to be used, the device is arranged so that the front tractor wheel 11 is received between the plates 29 above the support member 27. Then, the bolt or screw member 30 can be inserted through the side members and through the ribs 22 and through the plates 29 and through the wheel 11, as for example as shown in Figure 1 whereby the screw member 30 will serve to connect the sled runner 10 to the wheel 11. The pair of nuts 31 are adapted to be tightened whereby the plates 29 can be moved snugly against the sides of the wheel 11 and the cutouts 28 provide sufficient clearance to permit this adjustment of the plates 29.

Thus, with the sled runner 10 attached to the front wheel 11 of the tractor, it will be seen that when power is supplied to the rear wheels of the tractor, the sled runner will slide along the snow so as to prevent the front wheel from becoming bogged down in the snow whereby a tractor can be used in the usual manner even though there is adverse weather conditions.

As previously described, there is provided the longitudinally extending keel or bar 32 which helps prevent the device from slipping on icy or snowy surfaces. Furthermore, the upwardly curved portions 14 and 15 insure that the device will readily slide over snow or ice and these curved surfaces help insure that the tractor will move properly. Furthermore, the various surfaces of the sled runner are curved or rounded so as to help insure that there are no protruding parts which are likely to catch on stumps, trees, rocks or the like. The provision of the plurality of braces and plates and other parts as previously described insures that the device will be ruggedly constructed and will withstand rough usage in the field. The various parts can be welded together as desired.

The device can be readily disconnected from the wheel 11 by unscrewing the bolt 30 as for example when the tractor is to be used in the normal manner.

The parts can be made of any suitable material and in different shapes or sizes.

Thus, according to the present invention it will be seen that there has been provided a runner for use with a tractor whereby the tractor can be used even when there is deep snow on the ground. The front wheel of the tractor fits in between the plates 29 and the parts are constructed so that damage to the tractor tire is prevented. The keel 32 prevents the device from sliding sideways, and the wheel is held in place by means of the bolt 30. The device will fit front tractor wheels of different types or makes of tractors. When the device is mounted on a tractor wheel, the tractor can perform useful work even when there is snow on the ground so that the tractor will not remain idle during winter months. Without such a device, the front wheels would bog down so as to cause the rear wheels to spin, but with the sled runner of the present invention connected to the front wheels, the front wheels can slide over the snow. Thus, the present invention will increase the usefulness of a tractor since the tractor can be used throughout the year regardless of adverse or inclement weather conditions that may be present.

The parts are preferably made of a suitable material such as steel which can be readily welded and there are no parts to break-off or wear out, and the device will accommodate tractor wheels of different sizes. Thus, the cutouts 28 permit the plates to be moved so that tractor wheels of different sizes can be snugly gripped or engaged therebetween. Also, the device is constructed so that there will be no bending or buckling of the parts. The surfaces 14 and 15 are curved so that in the event the device strikes an object or obstacle, it will readily slide thereover. Furthermore, the tire is protected from various types of obstacles or objects such as stumps, logs, rocks or the like, and the tractor wheel will be prevented from accidentally moving sideways.

Minor changes in shape, size and rearrangement of details coming within the field of invention claimed may be resorted to in actual practice, if desired.

I claim:

1. In a device of the character described, a base including a main straight portion and upwardly curved front and rear portions, side members including intermediate straight sections arranged in spaced parallel relation with respect to each other, said side members further including front sections arranged angularly with respect to each other, a horizontally disposed front piece extending across the front sections of said side members, a back piece arranged above the rear of the base, spaced parallel horizontally disposed top members positioned between said front and back pieces, a pair of spaced parallel ribs arranged above the intermediate portion of said base, vertically disposed front and rear braces aligned with said ribs, a pair of spaced parallel partitions arranged transversely with respect to said ribs, a curved support member positioned between said ribs and partitions, there being cutouts in said support member, a pair of spaced parallel vertically disposed rectangular plates having their lower corner portions registering with said cutouts said plates being positioned intermediately of said ribs in parallel relation to said side members and said ribs and intermediately of said partitions at right angles thereto, said plates to be placed on opposite sides of a wheel positioned on and engaging said curved support member.

2. In a device of the character described, a base including a main straight portion and upwardly curved front and rear portions, side members including intermediate straight sections arranged in spaced parallel relation with respect to each other, said side members further including front sections arranged angularly with respect to each other, a horizontally disposed front piece extending across the front sections of said side members, a back piece arranged above the rear of the base, spaced parallel horizontally disposed top members positioned between said front and back pieces, a pair of spaced parallel ribs arranged above the intermediate portion of said base, vertically disposed front and rear braces aligned with said ribs, a pair of spaced parallel partitions arranged transversely with respect to said ribs, a curved support member positioned between said ribs and partitions, there being cutouts in said support member, a pair of spaced parallel vertically disposed rectangular plates having their lower corner portions registering with said cutouts said plates being positioned intermediately of said ribs in parallel relation to said side members and said ribs and intermediately of said partitions at right angles thereto, said plates to be placed on opposite sides of a wheel positioned on and engaging said curved support member, a screw member extending through the straight sections of the side members and through said plates, and securing elements arranged on said screw member.

3. The structure as defined in claim 2, and further including a keel bar on the lower portion of the base.

References Cited in the file of this patent

UNITED STATES PATENTS

| | | |
|---|---|---|
| 403,322 | Blankart | May 14, 1889 |
| 736,439 | Phillips et al. | Aug. 18, 1903 |
| 1,745,643 | Roessel | Feb. 4, 1930 |
| 2,284,075 | Tucker et al. | May 26, 1942 |
| 2,523,950 | Golubics | Sept. 26, 1950 |